United States Patent
Pisterzi

Patent Number: 6,084,762
Date of Patent: *Jul. 4, 2000

[54] CONNECTOR FOR A PROTECTOR BLOCK IN A TELECOMMUNICATIONS SYSTEM

[75] Inventor: Michael J. Pisterzi, Plano, Tex.

[73] Assignee: Alcatel USA Sourcing, L.P., Plano, Tex.

[*] Notice: This patent is subject to a terminal disclaimer.

[21] Appl. No.: 09/375,617

[22] Filed: Aug. 17, 1999

Related U.S. Application Data

[63] Continuation of application No. 08/979,018, Nov. 26, 1997, Pat. No. 6,008,976.

[51] Int. Cl.[7] ........................................... H02H 1/00

[52] U.S. Cl. ............................ 361/119; 361/56; 361/58; 361/118

[58] Field of Search ................................ 361/119, 56, 58, 361/111, 91.1, 115, 118

[56] References Cited

U.S. PATENT DOCUMENTS

| | | | |
|---|---|---|---|
| 3,601,538 | 8/1971 | May et al. | 179/2.5 |
| 3,643,029 | 2/1972 | Breazeale | 179/5 R |
| 5,150,271 | 9/1992 | Unterweger et al. | 361/119 |

*Primary Examiner*—Stephen W. Jackson
*Attorney, Agent, or Firm*—Baker Botts L.L.P.

[57] ABSTRACT

A telecommunications network (10) includes a main distribution frame (12) that receives telecommunications traffic carried over individual tip and ring signal line pairs (20) from trunks (18). The main distribution frame (12) provides the individual tip and ring signal line pairs (20) to a protector block (14). The protector block (14) includes a connector (22) for each individual tip and ring signal line pair (20). The connector (22) has a first terminal (24) that provides external access to low frequency voice band telecommunications traffic for POTS providers. The connector (22) has a second terminal (26) that provides external access to high frequency telecommunications traffic, such as ADSL for ADSL providers. The external access capability allows for the unbundling of physical connections at the main distribution frame (12) in order to provide competitive access to subscribers.

11 Claims, 1 Drawing Sheet

6,084,762

CONNECTOR FOR A PROTECTOR BLOCK IN A TELECOMMUNICATIONS SYSTEM

This application is a continuation of U.S. application Ser. No. 08/979,018 filed Nov. 26, 1997, now U.S. Pat. No. 6,008,976.

TECHNICAL FIELD OF THE INVENTION

The present invention relates in general to a telecommunications network configuration and more particularly to a connector for a protector block in a telecommunications system.

BACKGROUND OF THE INVENTION

In order to enhance service availability for telecommunications subscribers, telecommunications implementations have recently been geared toward a concept of unbundling. The unbundling concept is conceived to provide a degree of flexibility within telecommunications systems to allow a subscriber to select among different types of services from different providers regardless of which provider controls the physical connection for the subscriber. However, implementation of this unbundling concept is hampered due to the existing physical connections already in place. The existing physical connections make it difficult for service providers to gain access to subscribers in order to provide desired services. Therefore, it is desirable to provide access to existing physical connections without significant re-wiring of a telecommunications network.

SUMMARY OF THE INVENTION

From the foregoing, it may be appreciated that a need has arisen for a connector that provides external access to physical connections in a telecommunications network. In accordance with the present invention, a connector for a protector block in a telecommunications system is provided that substantially eliminates and reduces disadvantages and problems associated with conventional telecommunications networks.

According to an embodiment of the present invention, there is provided a connector for a protector block in a telecommunications system that includes a tip signal line, a ring signal line coupled to the tip signal line, and a ground signal line coupled to the tip and ring signal lines. The tip, ring, and ground signal lines are coupled such as to provide over-voltage protection. A first terminal is provided on the connector for external access to low frequency voice band telecommunications traffic on the tip and ring signal lines. Further, a first subscriber line may be connected to the tip signal line and a second subscriber line may be connected to the ring signal line with external access available to the first and second subscriber lines through a second terminal. High frequency telecommunications traffic may be carried on the first and second subscriber lines. Selection between low frequency telecommunication traffic and high frequency telecommunications traffic is available for external access at the first and second terminals.

The present invention provides various advantages over conventional telecommunications networks. For example, one technical advantage is the ability to provide external access to physical connections at a protector block in a telecommunications network. Another technical advantage is to select between two separate frequencies of telecommunication traffic transmission. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
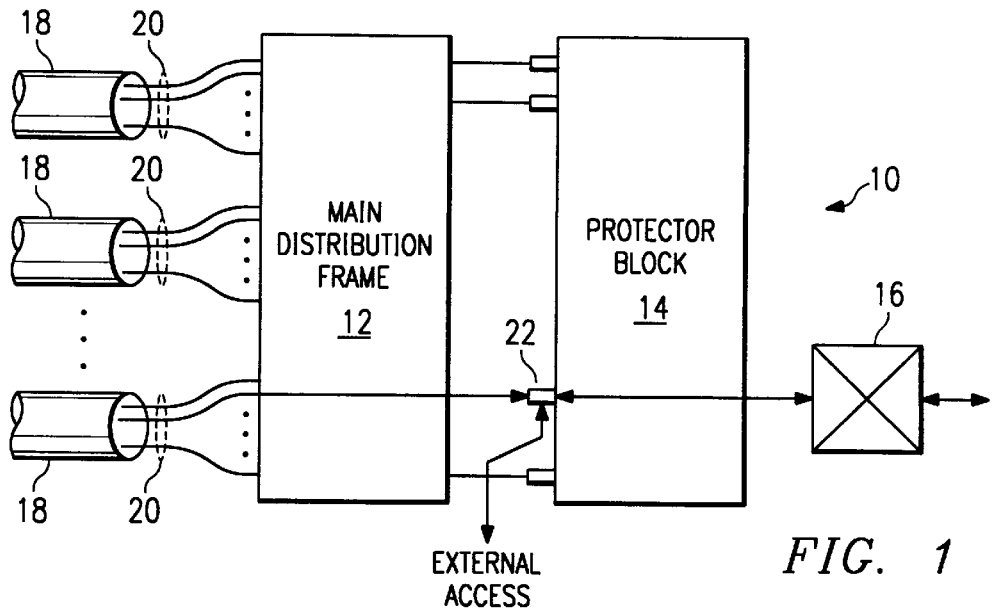
FIG. 1 illustrates a simplified block diagram of a telecommunications network.

FIG. 1 is a simplified block diagram of a telecommunications network 10. Telecommunications network 10 includes a main distribution frame 12, a protector block 14, and at least one telecommunications switching device 16. Main distribution frame 12 receives and provides telecommunications from and to a plurality of trunks 18. Each trunk 18 has individual tip and ring signal line pairs 20 that feed through main distribution frame 12 and protector block 14 to telecommunications switching device 16. Protector block 14 includes a connector 22 for each individual tip and ring signal line pair 20 to allow for external access and unbundling of physical connections for competitive access to loops by service providers.

Figure 2:
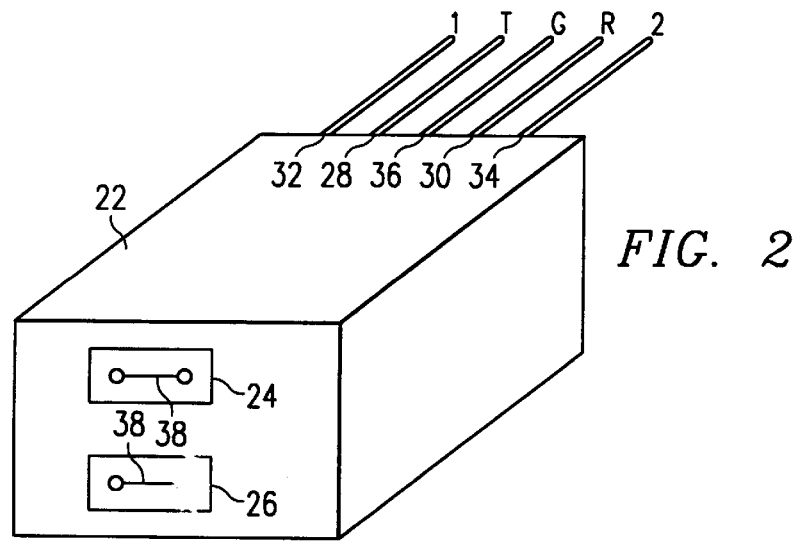
FIG. 2 illustrates a simplified diagram of a connector used within the telecommunications network.

FIG. 2 is a simplified diagram of connector 22. Connector 22 includes a first terminal 24 and a second terminal 26. First terminal 24 provides an external access capability to an individual tip and ring signal line pair 20 that includes a tip signal line 28 and a ring signal line 30. Typically, tip signal line 28 and ring signal line 30 carry low frequency voice band telecommunications traffic. Second terminal 26 provides an external access capability to high frequency telecommunications traffic carried on a first subscriber line 32 and a second subscriber line 34. Connector 22 also has a ground signal line 36. Though capable of transferring telecommunications traffic in a variety of frequencies, for example and discussion purposes, tip and ring signal line pair 20 shall be discussed as carrying plain old telephone service (POTS) telecommunications traffic accessed on tip signal line 28 and ring signal line 30 and asymmetrical digital subscriber line (ADSL) telecommunications traffic accessed on first subscriber line 32 and second subscriber line 34.

First terminal 24 provides external access to tip signal line 28 and ring signal line 30 for low frequency voice band telecommunications traffic typically handled by POTS providers. When a connection is made to connector 22 at first terminal 24, the POTS telecommunication traffic from the corresponding individual tip and ring signal pair 20 is externally provided to a service provider instead of to telecommunications switching device 16. This external access capability allows for the unbundling of physical connections in order to provide a wider range of telecommunications services. Though the POTS telecommunications traffic is routed to a service provider through first terminal 24, the ADSL telecommunications traffic may still be provided to telecommunications switching device 16 unless a connection is made to second terminal 26 for external access to the ADSL traffic by the same or another service provider. First terminal 24 and second terminal 26 may include jumpers 38 when external access is not desired to allow the POTS and ADSL telecommunications traffic to feed to telecommunications switching device 16.

Figure 3:
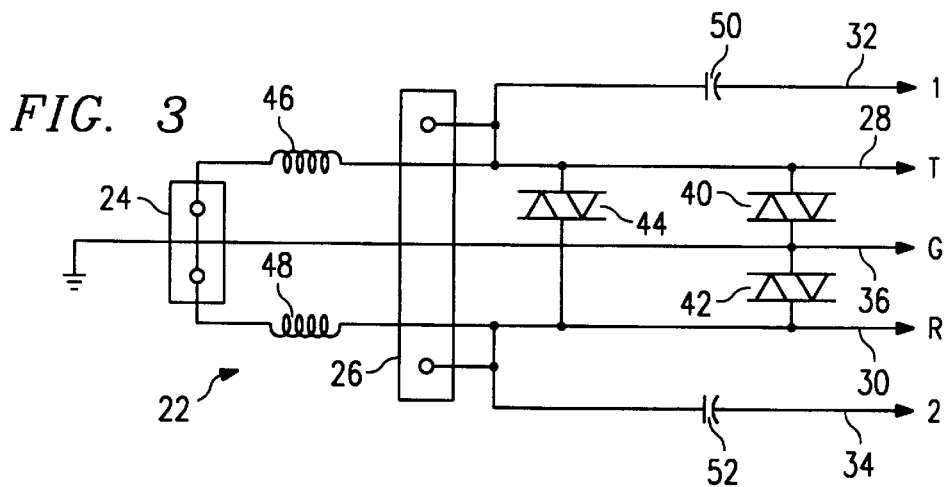
FIG. 3 illustrates a simplified schematic diagram of the connector.

FIG. 3 is a simplified schematic diagram of connector 22. Connector 22 includes tip signal line 28, ring signal line 30, first subscriber line 32, second subscriber line 34, and ground signal line 36. First subscriber line 32 is coupled to tip signal line 28 and second subscriber line 34 is coupled to ring signal line 30 in order to provide multiple frequency use capability on individual tip and ring signal line pair 20. Ground signal line 36 is coupled to tip signal line 28 and ring signal line 30 by a first thyristor device 40 and a second thyristor device 42. Similarly, tip signal line 28 is coupled to ring signal line 30 by a third thyristor device 44. First thyristor device 40, second thyristor device 42, and third thyristor device 44 provide over-voltage protection for individual tip and ring signal line pair 20 that may occur due to power surges and lightning strikes.

Low pass filtering is performed on tip signal line 28 and ring signal line 30 in order to isolate the POTS telecommunications traffic carried on individual tip and ring signal line pair 20. Low pass filtering may be performed through a first inductor 46 and a second inductor 48 on tip signal line 28 and ring signal line 30, respectively, though other conventional low pass filtering techniques may equally be implemented. High pass filtering is performed on first subscriber line 32 and second subscriber line 34 in order to isolate the ADSL telecommunications traffic carried on individual tip and ring signal line pair 20. High pass filtering may be performed through a first capacitor 50 and a second capacitor 52 on tip signal line 28 and ring signal line 30, respectively, though other conventional high pass filtering techniques may equally be implemented.

Thus, it is apparent that there has been provided, in accordance with the present invention, a connector for a protector block in a telecommunications system that satisfies the advantages set forth above. Although the present invention has been described in detail, it should be understood that various changes, substitutions, and alterations may be made herein. For example, though discussed in relation with a main distribution frame, protector block 14 with connectors 22 may be implemented where no main distribution frame is used, as in remote cabinet applications, small line size projects, and customer premises environment. Anywhere a protector block is implemented, the present invention may be used to gain access to the signal lines without a rewiring effort. Other examples may be readily ascertainable by those skilled in the art and may be made without departing from the spirit and scope of the present invention as defined by the following claims.

What is claimed is:

1. A connector for a protector block in a telecommunications system, comprising:
   a tip signal line;
   a ring signal line coupled to the tip signal line;
   a ground signal line coupled to the tip signal line and the ring signal line;
   a first terminal operable to provide external access to the tip and ring signal lines;
   a first subscriber line coupled to the tip signal line;
   a second subscriber line coupled to the ring signal line, wherein the tip and ring signal lines are operable to carry low frequency voice band telecommunications traffic.

2. The connector of claim 1, wherein the tip signal line and the ring signal line each include a low pass filter.

3. The connector of claim 2, wherein the low pass filters for the tip and ring signal lines each include an inductor element.

4. The connector of claim 1, wherein the ring signal line is coupled to the tip signal line by a first thyristor device, the ground signal line being coupled to the tip signal line and the ring signal line by a second thyristor device and a third thyristor device respectively, the first, second, and third thyristor devices providing over-voltage protection on the tip, ring, and ground signal lines.

5. The connector of claim 1, wherein the first and second subscriber lines each include a high pass filter.

6. The connector of claim 5, wherein the high pass filters of the first and second subscriber lines each include a capacitor element.

7. The connector of claim 1, wherein telecommunications signals carried over the tip and ring signal lines are selected to be routed for external access through the first terminal.

8. The connector of claim 1, further comprising:
   a jumper across the first terminal to allow telecommunications signals to be carried on the tip and ring signal lines without external access through the first terminal.

9. The connector of claim 1, wherein the low frequency voice band telecommunications traffic is plain old telephone service traffic.

10. The connector of claim 1, wherein the first and second subscriber lines carry high frequency telecommunications traffic regardless of whether or not the first terminal provides external access to the tip and ring signals.

11. The connector of claim 10, wherein the high frequency telecommunications traffic is asymmetrical digital subscriber line traffic.

\* \* \* \* \*